April 14, 1964  B. L. THOMPSON ETAL  3,129,013
POWER UNIT ASSEMBLY

Filed May 2, 1960  3 Sheets-Sheet 1

Benny L. Thompson,
Kermit L. Thompson,
INVENTORS.

BY

Billy A. Robbins

ATTORNEY.

Benny L. Thompson,
Kermit L. Thompson,
INVENTORS.

BY.

Billy A. Robbins

ATTORNEY.

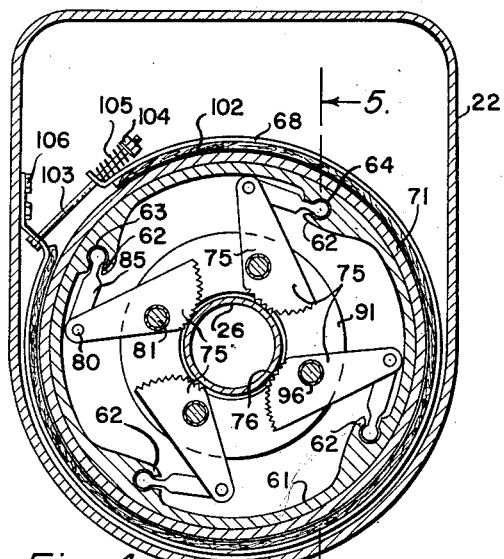
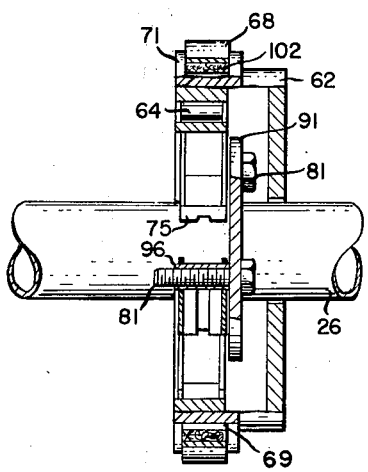
Fig. 5.
Fig. 4.
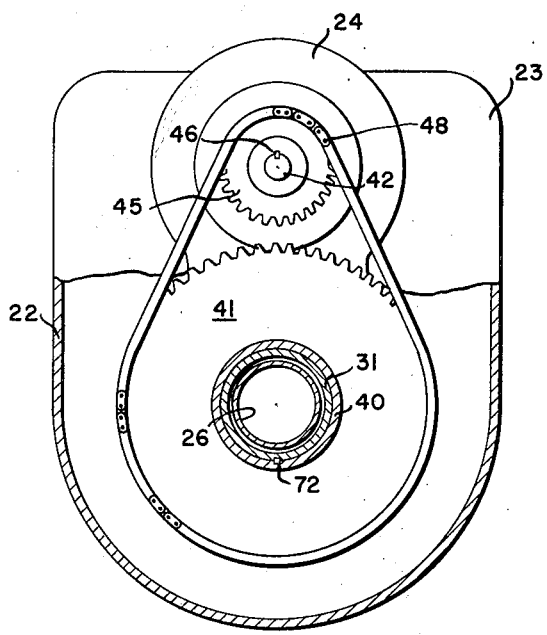
Fig. 3.
Benny L. Thompson,
Kermit L. Thompson,
INVENTORS
BY.
ATTORNEY.

3,129,013
POWER UNIT ASSEMBLY
Benny L. Thompson, 16517 Superior St., Granada Hills, Calif., and Kermit L. Thompson, 13323 Glenoaks, Sylmar, Calif.
Filed May 2, 1960, Ser. No. 26,314
5 Claims. (Cl. 279—109)

This invention relates to power transmitting apparatus and more particularly to a power transmitting unit for use in combination with a supporting and positioning means to grip and rotate an elongated member.

There has been a long felt need in the art for a power transmitting unit which can controllably grip and rotate an elongated member and which is operable in any attitude. Such a power transmitting unit has many applications; for example, earth drilling or boring for any desired purpose, installation of utility services, for cutting weeds or other vegetation growing in relatively inaccessible locations, or many other applications which will become apparent to one skilled in the art by reading the following description. For purposes of clarity and ease of description, the specification will particularly describe the power transmitting unit of the present invention as it may be used for installing a utility service. It is to be expressly understood, however, that this description is not to be taken as a limitation upon the scope of the present invention which is defined in the appended claims.

It has long been a problem in the prior art to efficiently and quickly install water mains, gas lines, or the like. This problem is particularly acute where such mains or lines must be placed underneath sidewalks, streets or other objects which for various reasons cannot be disturbed. In the past when heavy pipe or long sections of pipe were to be installed, machinery was utilized which nonrotatingly forced a drill rod through the ground in the desired direction. The drill rod was then withdrawn and the particular desired main, line, or the like, inserted in its place. Such prior art equipment has, for the most part, been quite complex. This complexity in turn presented drill rod alignment problems, required relatively slow operation, necessitated large crews to operate the equipment, and caused maintenance costs to be quite high.

Where short sections of pipe were to be installed, manually operated apparatus which rotated a drill or pipe into the ground was utilized. This equipment gripped the end portion of the pipe and, through the pressure exerted by one or more operators, the pipe was drilled through the earth. It can readily be seen that in utilizing such equipment, the alignment of the pipe was exceedingly difficult to maintain and when the pipe met rocks or other obstructions in the earth, additional force was required and, therefore, additional operators, to push the rotating pipe through the earth. Since the manual apparatus gripped the pipe at the end thereof, this placed a severe limitation on the length of pipe which would be installed without causing it to buckle or to become so heavy that the equipment and the operators could not handle it.

Accordingly, it is an object of the present invention to provide a power transmitting unit for gripping and rotating an elongated member.

It is another object of the present invention to provide a power transmitting unit which is operable in any attitude for imparting rotation to an elongated member which is gripped thereby.

It is another object of the present invention to provide a power unit which may be utilized for placing pipe in the earth without disturbing the surface thereof, which power unit may insert pipe faster than has heretofore been possible by prior art techniques.

It is another object of the present invention to provide a power unit for placing pipe under the surface of the earth which easily and readily maintains alignment of the pipe as it is being inserted in place.

It is another object of the present invention to provide a power unit which is capable of placing a desired pipe directly into the earth in the desired position and location.

It is another object of the present invention to provide a power unit for placing a pipe in the earth which requires a minimum number of operators.

It is another object of the present invention to provide a power unit which is simple and rugged and which requires little maintenance.

It is another object of the present invention to provide a power unit for placing pipe in the earth which is capable of accurately inserting substantially unlimited lengths of pipe in the desired location without buckling.

It is another object of the present invention to provide a power unit for placing pipe having any desired diameter within the earth and underneath objects.

In accordance with one aspect of the present invention, there is provided a power unit which supports an elongated member, such as, for example, a drill rod, the shaft of a rotary implement, or the like, at at least two spaced apart points. The power unit imparts rotation to the elongated member by gripping it. The rotating elongated member may be supported at any desired attitude for any particular application.

In accordance with another aspect of the present invention, there is provided a power unit which releaseably grips an elongated member and rotatably urges it in a desired direction. The grip upon the elongated member is then released and the power unit is moved in the reverse direction to obtain a new grip so that it may again urge the elongated member in the desired direction. The power unit supports the elongated member at at least two spaced apart points during the time it is being rotated and urged in the desired direction.

In accordance with another and more particular aspect of the present invention, the power unit is supported upon a vehicular means which is used to urge the power unit in the desired direction. An elongated member is inserted through a tubular member disposed within the power unit and through a pair of spaced apart gripping members which are axially aligned with the tubular member. The tubular member, along with the gripping member, is rotated. In one sense of direction of rotation the gripping members are actuated in such a manner as to grip, both axially and angularly, and rotate the elongated member while the vehicular means is urging the entire unit, including the elongated member in a desired direction. In the opposite direction of rotation the gripping members release their grip upon the elongated member, thus causing it to become non-rotating and free to slide axially with respect to the tubular member. The vehicular means then moves the power unit in the opposite direction after which time the direction of rotation of the tubular member and the gripping members is again reversed and the gripping members grip the elongated member and once again it is rotatingly urged in the desired direction by the vehicular means.

Additional objects of the present invention will become apparent from a consideration of the following description taken in conjunction with the accompanying drawings, which are presented by way of example only and are not intended as a limitation upon the present invention, and in which:

FIG. 3 is a cross-sectional view of the driving mechanism of the power unit taken about the lines 3—3 of FIG. 2;

FIG. 4 is a cross-sectional view of a gripping member of the power unit taken about the lines 4—4 of FIG. 2; and FIG. 5 is a cross-sectional view taken about the lines 5—5 of FIG. 4.

Figure 1:
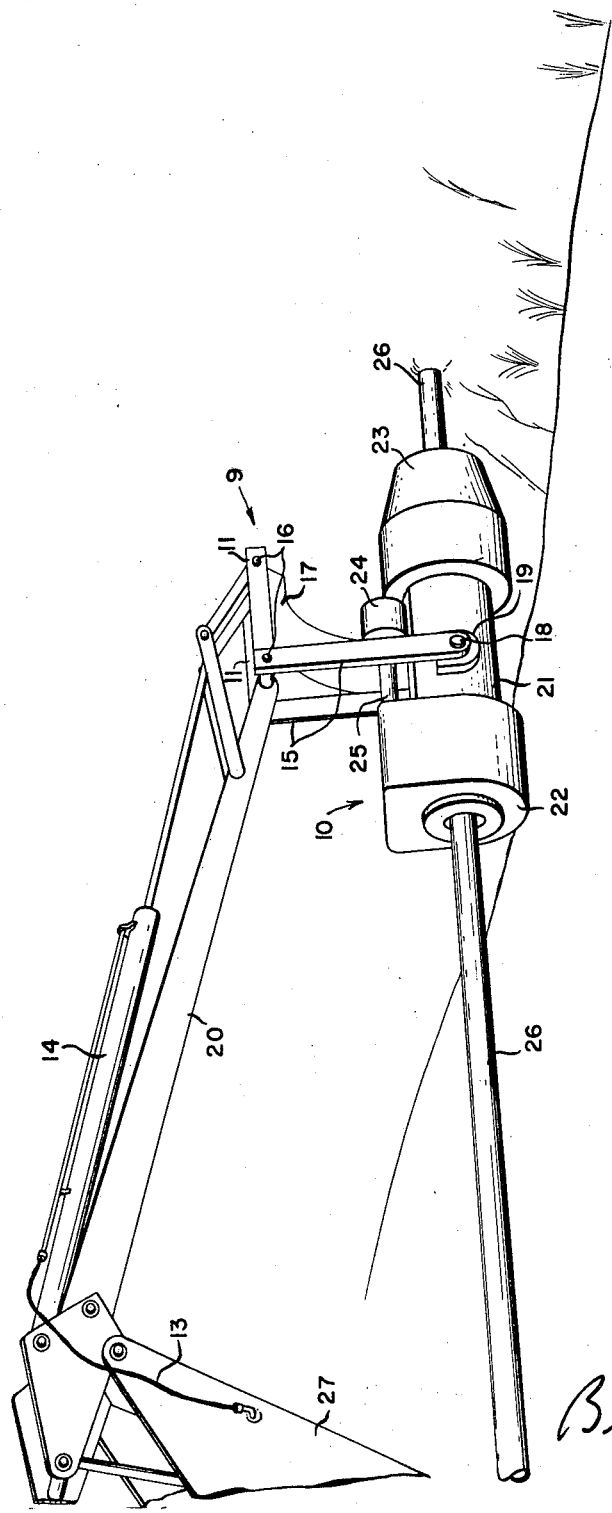
FIG. 1 is a perspective view illustrating the power unit and a vehicular unit in accordance with the present invention.

Referring now to the drawings and more particularly to FIG. 1 thereof, there is illustrated a power unit in accordance with the present invention as it would appear in actual use; for example, in placing a water main in the desired location without breaking the surface of the earth.

As is illustrated in FIG. 1, the power unit 10 is affixed to a vehicular means (not shown) such as a backhoe or the like. It is to be expressly understood that any vehicular means may be used in combination with the power unit of the present invention although a backhoe will be used in the following description. The vehicular means forms no part of the present invention and is, therefore, not shown in the drawings with exception of illustrating one means of affixing the power unit of the present invention thereto.

The power unit 10 is affixed to the backhoe by connecting the harness member 9 to the boom 20 by use of the horizontal pins 16. The harness 9 includes vertical members 15 which are preferably integral with the horizontal members 11. A web 17 is disposed upon each of the vertical members 15 and horizontal members 11 in order to provide additional strength and rigidity to the harness 9. An opening is provided at the lower portion of each of the vertical members 15 in order to provide reception of a pivot member 18. The pivot member 18 is affixed to the housing 21 for the power unit by a bracket 19. The housing 21 includes a forward guard 23 and a rear guard 22 which protects portions of the power unit mechanism from dirt, debris, and the like, as will be more fully described hereinafter.

The attitude and reach of the power unit 10 is adjusted by actuating cylinder 14 which receives power through hydraulic line 13. The position of the power unit 10 is controlled by the lift boom 27.

A prime mover, such as a motor 24, which may be pneumatic, hydraulic, electric, or the like, is mounted on the top portion of the housing 21 and has a source of power (not shown) connected thereto by way of fittings on the boom 27. A spindle or drive shaft is housed within the spindle housing 25 and extends from the motor 24 forwardly and into cooperation with drive means for rotation of various portions of the internal mechanisms of the power unit, as will be described more fully hereinafter. An elongated member 26 is inserted through the power unit 10 by utilizing openings provided therefor. The elongated member 26 is preferably a section of pipe and may be the pipe which is to be inserted in place into the earth. The remainder of the following description will be made with reference to a pipe as the elongated member, however, it is to be expressly understood that any elongated member desired may be used irrespective of cross-sectional configuration.

As can be seen in FIG. 1, the pipe 26 is being forced through the earth by the power unit 10 in conjunction with the backhoe. The power unit is positioned so that its axis is substantially in alignment with the direction which is desired for the ultimate pipe location that is to be used for supplying a utility service such as water, gas, or electricity to a given area. After the power unit 10 is thus aligned in the desired position by manipulation of the backhoe and its booms 20 and 27, the pipe 26 is inserted through the openings provided therefor in the power unit 10. After the pipe has been inserted through the power unit 10, a drill bit may be placed upon the end thereof. At this point the motor 24 is actuated which in turn causes the internal mechanism of the power unit 10 to rotate in a given direction. As the power unit rotates in this given direction, the pipe 26 is gripped by the power unit and is supported thereby. The entire power unit is then urged toward the earth by the boom 20 on the backhoe until the forward portion of the front guard 23 approaches the vertical portion of the earth embankment. At this point the direction of rotation of the motor 24 is reversed. This reversal of rotation causes the power unit to release its grip upon the pipe 26. The boom 20 then moves the power unit in a direction away from the earth and along the pipe 26 for a predetermined distance. The direction of rotation of the motor is once more reversed so that it is rotating in its initial direction. At this point, the pipe 26 is once again gripped and rotated by the power unit 10 and the boom 20 urges the power unit toward the earth, thus placing another length of the pipe into the earth. This operation is continued until such time as the pipe is placed in position underneath the surface of the earth in the desired location.

By operating a power unit in accordance with the present invention as above very briefly outline, a length of pipe, for example a two inch water main, may be placed under the surface of the earth without disturbing the surface of the earth at a rate of approximately 60 feet per minute. The fastest rate of application of pipe underneath the surface of the earth by any device heretofore known to the prior art has been approximately 7 feet per minute. It is, therefore, seen that by utilizing the power unit of the present invention an exceedingly large increase in efficiency is obtained.

It should also be noted that by utilizing the power unit of the present invention, as illustrated in FIG. 1, that it requires only two operators to carry out the entire operation of aligning the power unit and placing the pipe in the earth in the desired location. In the use of prior art apparatus and techniques, a minimum crew of five men was required to accomplish a similar type of installation. It is, therefore, seen that by utilizing the power unit of the present invention a large saving in man-hours is accomplished.

Figure 2:
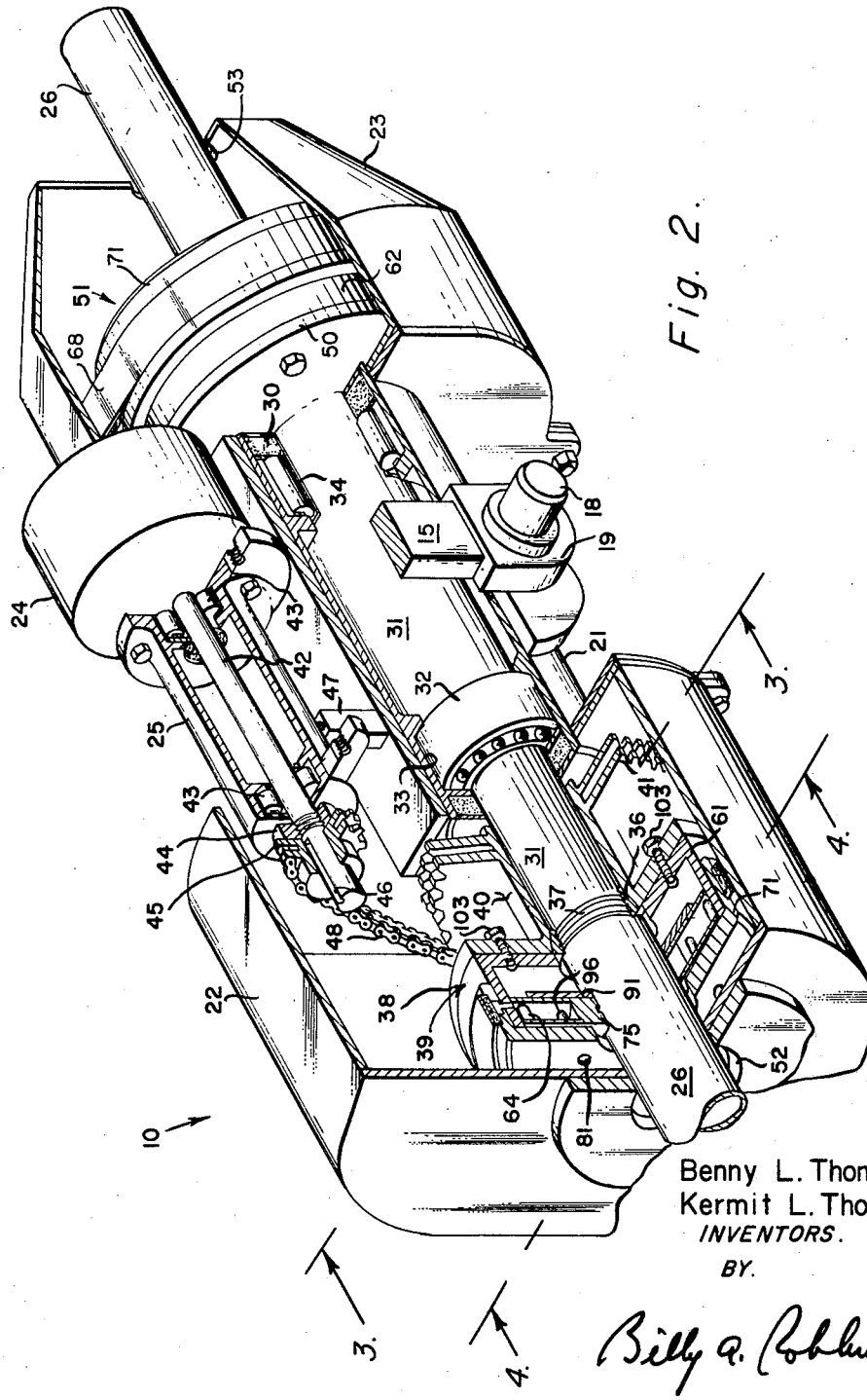
FIG. 2 is an isometric view, partly in cross-section, illustrating the power unit of the present invention more in detail.

Referring now more particularly to FIG. 2, the power unit of the present invention is shown more in detail by having portions of the housing removed therefrom and shown in cross-section so that the interior of the power unit may readily be illustrated.

As is therein illustrated, a tubular member 31 and a pair of chucks 39 and 51 are interconnected and axially disposed and housed within the power unit housing 21. The tubular member 31 is supported within a forward bearing 34 that is held in place within a bearing recess 30 in the forward portion of the housing 21 and by a rear bearing 32 which is held in place in a bearing recess 33 in the rear section of the housing 21. The tubular member 31 is retained in place within the flange 38 by means of a tubular member lock or assembly nut 36 which fits upon the threads 37 disposed upon the end portion of the tubular member 31. The flange 50 and the tubular member 31 are interconnected in similar manner. Flange 38 and main sprocket 41 are interconnected and bridged by the laterally extending portion 40 between them. Rigidly affixed, for example by bolts, to flange 38 is the drive casting of the chuck 39 which forms a part of the rear gripping means. The gripping means in the power unit of the present invention is illustrated as a chuck which is described more in detail hereafter. It has been found that a single chuck operates quite satisfactorily for gripping and rotating pipe 26 so long as pipe 26 is supported at one additional point spaced from the single chuck. Such a supporting point may be located on flange 50. It has, however, been found that where additional gripping action is desired, a second chuck may be affixed to flange 50 as illustrated in FIG. 2. It should also be understood that the gripping power of the power unit may also be increased by utilizing double chucks.

A spindle or drive shaft 42 extends from motor 24 and is in connection therewith for the purpose of transmitting power therefrom. The drive shaft 42 is housed within the drive shaft housing mechanism 25. The drive shaft 42 is mounted within sealed bearings 43 and is held in place by a lock nut 44. A driving gear 45 is keyed by means of key way 46 upon drive shaft 42. A chain drive 48 interconnects the driving gear 45 with the main sprocket 41 to thereby impart power from the motor 24 to the driving section of the power unit 10. A tensioning means such as an adjustment screw is supported within tension adjustment housing 47 to adjust the tension upon the chain drive 48. Although there has been illustrated as a preferable means of driving and imparting power to the power unit 10 a chain drive, it is to be expressly understood that this is by way of illustration only and that additional methods of transmitting power from the motor 24 to the internal rotating sections of the power unit may be utilized such as, for example, a direct gearing system, belts, or the like.

The details of a preferred chuck which may be used with the power unit of the present invention is set forth below. Such a chuck includes jaws 75 held in place by a ring 91 to pivot about a bushing 96 in response to force applied through a pin 64 to grip and rotate pipe 26.

The operation of the power unit 10 as illustrated in FIG. 2 is as follows. A pipe 26 is inserted through the openings 52 in the rear guard 22 and 53 in the front guard 23, and through the axially aligned tubular member 31 and chucks 39 and 51. After the power unit is properly aligned, power is applied through the motor 24 and drive shaft 42 to the chain drive 48 thereby causing the chucks 39 and 51 and the tubular member 31 to rotate. As the chucks rotate in a first direction, the gripping jaws 75 disposed therein are caused to actuate and grip the surfaces of the pipe 26 at opposite ends of the power unit thereby supporting the pipe. Due to the gripping action and the rotation of the chucks, the pipe is also caused to rotate. The vehicular means which is interconnected with the power unit 10 then urges the power unit and the rotating pipe forward for a desired and predetermined distance. After the power unit has been thusly urged forward, the direction of rotation of the motor 24 is reversed. This reversal of direction of rotation causes the jaws 75 within the chucks to release the pipe 26, which then becomes stationary.

At this point the vehicular means moves the power unit 10 along the pipe in a backward direction, after which time the direction of the motor 24 is once again reversed so that it is rotating in its initial direction thereby causing the jaws within the chucks to grip the pipe and once more start it to rotating. At this point the power unit is again urged forward while the pipe is rotating thereby pushing the pipe into the earth the given distance depending upon the amount of movement which is permitted by the vehicular means and the power unit 10. As the vehicular means reciprocates the power unit 10 along the pipe 26, the power unit follows the pipe 26 by pivoting about pivot points 18.

Referring now more particularly to FIG. 3, there is illustrated more in detail the drive mechanism of the power unit of the present invention. As is therein illustrated, the drive gear 45 is keyed by means of the key way and key 46 upon the drive shaft 42 which is driven by the motor 24. The chain 48 interconnects the drive gear 45 with the main sprocket 41. As is illustrated, the main sprocket 41 is, along with the flange 38, as illustrated in FIG. 2, rigidly affixed to the tubular member 31 by means of key 72 which is disposed within the aligned key way recesses. The assembly nut 36 (FIG. 2) retains the key 72 in place during operation of the power unit. The pipe 26 is shown disposed within the tubular member 31.

Referring now more particularly to FIGS. 4 and 5, there is illustrated one type of chuck which may be used with the power unit of the present invention. As is therein illustrated, the chuck includes a gripping jaw drive casting 61 and an outer casting 71, the former being bolted to the flange 38 by a set of bolts 103 (see FIG. 2). FIG. 4 is taken by removing the face of outer casting 71. Four gripping jaws 75 are equally spaced about the interior of the chuck. Each of the jaws 75 pivots about a bolt 81 and bushing 96. A ring 91, forming a second jaw driving member is spaced inwardly from the face of the outer casting 71 and is used to hold jaws 75 in place. Bushing 96 is also used as a spacer between ring 91 and the face of outer casting 71.

Connecting rods 85 are held in place within the outer ends of jaws 75 by pins 80. A cylindrical end portion 64 of connecting rods 85 fits within an opening 63 provided in inwardly extending protrusions 62 of drive casting 61.

A pressure band 68 having a fibre inner portion 102 fits within a recess 69 provided within outer casting 71. A bolt 103 and nut 104 hold band 68 in place and through spring 105 applies pressure to band 68 and in turn to outer casting 71. Band 68 is anchored as at 106 to the surface of the rear guard 22.

The operation of the chuck is as follows. As the tubular member 31, along with the flange 38, as illustrated in FIG. 2, is rotated, for example, clockwise as shown in FIG. 3, power is applied to the drive casting 61 and it is rotated therewith. As the drive casting is initially rotated, the outer casting 71 remains stationary. At this point the protrusions 62 exert a force on connecting rods 85 and urge them in a clockwise direction as viewed in FIG. 4. As the connecting rods 85 are urged in a clockwise direction, the outer portions of the jaws 75 are also urged in a clockwise direction. This in turn causes the jaws 75 to pivot about bolts 81 and the inner portions thereof to be urged in a counter-clockwise direction and to, therefore, be urged forward and inwardly toward the pipe 26, thus causing the teeth of the jaws 75 to contact and grip the pipe 26 both axially to prevent slipping along the length of the unit and angularly to prevent relative rotation with respect to the jaws. After the initial contact and gripping by the jaws 75 on pipe 26, force is continuously applied by the drive casting 61 until the tension or braking force which is applied by band 68 is overcome. At this point the outer casting 71 also begins to rotate. As can readily be seen, the amount of force exerted by the jaws 75 upon the surface of the pipe 26 is a direct function of the amount of tension; and therefore friction, applied by the band 68 to the top casting 71. If the tension of band 68 is small, then less force is applied by the jaws 75 to the pipe 26 and less power is needed to rotate the pipe 26. Likewise, however, since less power is applied directly to the pipe 26, it may have a tendency to slip or to cease rotation if obstructions are met by the end of the pipe while it is being pushed through the earth. If the band 68 is tightened to a greater extent, then more power is applied by the teeth of the jaws 75 and the pipe has no tendency to slip and will very easily be pushed through the earth.

Although only the chuck at the rear portion of the power unit 10 has been illustrated in detail in FIGS. 4 and 5, it should be understood that a chuck 51, mounted at the forward section of the power unit 10, may be used if desired. Such additional chuck would be similar in construction but the operation thereof would be exactly the reverse of that which is described with respect to FIGS. 4 and 5 above. That is, when the chuck is rotated in a clockwise direction as viewed from the front section of the power unit, the jaws of the chuck are caused to open and when the unit is rotated in a counter-clockwise direction as viewed from the front section of power unit 10, the jaws are caused to close upon the pipe, whereby the two chucks are operative to grip and release the pipe in unison. In this manner it is seen that the pipe 26, as it is being rotatably urged forward through the earth, is supported at spaced apart points disposed at each end of the tubular member 31. These spaced apart support points for the pipe are quite critical whether gripping action is exerted or not in that if they are positioned too closely together the alignment of the pipe as it is being forced through the earth becomes more difficult to maintain. The chucks may, of course, be spaced farther apart without affecting the alignment problem. However, the limitation upon the distance apart that the chucks may be spaced is simply one of maintaining a power unit which is relatively small and easily portable and disposed within working position for any given application.

Although the power unit as above described is limited to utilization with a pipe having approximately a two and one-half inch diameter, it is to be expressly understood that the power unit may be increased in size and the motor for imparting power to the pipe may be increased in size in order to accomplish the use with any pipe of a given and desired diameter.

The unit as illustrated in the drawings and described above may also be utilized to place a larger pipe in the soil than the maximum diameter of the pipe which may be utilized with the power unit of the dimensions above set forth. This may be accomplished as follows. A pipe having a desired diameter, for example a one inch diameter pipe, may be placed through the soil. After the pipe has been placed through in the desired area, a reaming bit may be attached to the end thereof. The pipe may then be withdrawn through the opening which has previously been provided by reversing the operation of the power unit. That is, a grip will be taken upon the pipe at the point adjacent the entry of the pipe into the earth and the power unit will then be drawn in a backward direction for a predetermined distance. At this point the chucks will be caused to release the pipe. The power unit will be urged forward and then the rotation thereof reversed once more causing the chucks to grip the pipe and withdraw it through the hole. As the pipe is withdrawn from the opening which has been provided in the soil, the reaming bit will enlarge the opening. A cable may be placed through the enlarged opening which has been thus provided and the large pipe drawn therethrough by the use of a winch or the like or by utilizing the power unit of the present invention. It is, therefore, seen that by utilization of the power unit of the present invention, a pipe of any given diameter which is desired may be placed within the earth without breaking the surface thereof.

It should also be expressly understood that although a pipe or drill rod, such as illustrated at 26 in the various drawings of the preferred embodiment of the present invention, may be forced through the earth in a dry condition, if such is desired, the soil which is removed at the time the pipe is bored through the earth may be washed around the outside edges of the pipe and into a disposal trench by means of forcing fluids, such as water, through the interior surface of the pipe so that it is forced out the end portion thereof around the bit and along the outside edges of the pipe and out of the hole. This, therefore, will leave an exceedingly clean opening in which to place a pipe or in which to leave the pipe which has been bored through the earth.

It should also be understood that the power unit of the present invention may be utilized for other purposes as above indicated. For example, a short length of pipe or rod may be placed within the internal portion of the power unit and the jaws closed thereon. The rod may have a blade, propellor, or the like, connected to the end thereof so that the entire unit may then be placed in the desired attitude by a particular vehicular means having a moveable boom or the like thereon. As the power unit is rotated, the blade or propellor is also caused to rotate and may be disposed, for example, parallel to the surface of the earth in order to permit it to cut grass, weeds, or the like, in such locations, such as embankments, where it is either impossible or undesirable to dispose and operate cutting apparatus such as sickles or mowers. It is, therefore, seen that the power unit of the present invention is a versatile, portable unit which may be utilized for a number of applications.

There has been thus disclosed a power unit which is simple, rugged, requires a minimum of personnel to operate, and which can place a pipe in any given position within the earth which is desired for a particular application in order to provide a service such as water, gas, electricity, or the like, to a given area or building, or which may be used in any given desired application where rotational power may be needed.

What is claimed is:

1. A power transmitting unit for use in combination with a movable boom, said power transmitting unit comprising: a frame structure adapted to be connected to said boom; a tubular member carried by said frame structure and having an axis and first and second ends; a chuck disposed at said first end of said tubular member substantially coaxially therewith and supported by said frame structure, said chuck including first and second members disposed substantially concentrically about said axis of tubular member and having relative movement there between, jaw means pivotally connected to said first member, means connecting said jaw means to said second member, and friction means affixed to said frame and surrounding said first member; power means; and means connecting said power means in driving relationship to said second member, whereby rotation of said second member in one direction with respect to said first member moves said jaw means first into engagement with a means to be driven and thereafter, upon overcoming said friction means, causes rotation of said chuck.

2. A power transmitting unit as defined in claim 1 which further includes a second chuck disposed at said second end of said tubular member and supported by said frame, said second chuck being substantially of the same structure as said chuck.

3. A power transmitting unit as defined in claim 1 in which said friction means includes means for adjusting the amount of friction which must be overcome prior to rotation of said chuck.

4. A power transmitting unit as defined in claim 1 in which said tubular member is rotatable about said axis and which further includes means for connecting said tubular member to said second member of said chuck.

5. A power transmitting unit as defined in claim 4 in which said means connecting said power means to said second member includes sprocket means affixed to said tubular member, and a chain drive member in engagement therewith.

References Cited in the file of this patent

UNITED STATES PATENTS

| | | |
|---|---|---|
| 510,148 | Wyatt | Dec. 5, 1893 |
| 614,333 | MacReady | Nov. 15, 1898 |
| 931,611 | Hutchings | Aug. 17, 1909 |
| 2,060,189 | Foster | Nov. 10, 1936 |
| 2,226,643 | Swansen | Dec. 31, 1940 |
| 2,614,808 | Curtis et al. | Oct. 21, 1952 |
| 2,730,330 | Ball | Jan. 10, 1956 |
| 2,916,290 | Skillin | Dec. 8, 1959 |
| 2,969,844 | Hamrick | Jan. 31, 1961 |
| 3,005,638 | McConnell | Oct. 24, 1961 |
| 3,016,245 | Zelewsky | Jan. 9, 1962 |

FOREIGN PATENTS

| | | |
|---|---|---|
| 638,635 | Great Britain | Apr. 22, 1947 |
| 139,289 | Australia | Nov. 3, 1950 |